United States Patent
Frazier et al.

[11] Patent Number: 5,088,643
[45] Date of Patent: Feb. 18, 1992

[54] METHOD FOR BONDING POUR SPOUTS TO CONTAINERS

[75] Inventors: Stephen L. Frazier, Midlothian, Va.; James A. Hiller, Trout Run, Pa.

[73] Assignee: Westvaco Company, New York, N.Y.

[21] Appl. No.: 765,987

[22] Filed: Sep. 26, 1991

[51] Int. Cl.⁵ .................................. B65D 43/00
[52] U.S. Cl. .................. 229/125.15; 493/53; 493/87; 493/326; 427/40; 427/41
[58] Field of Search ........... 229/125.15, 125.33; 427/39, 40, 41, 43.1; 493/53, 55, 59, 87, 320, 326, 467; 220/540, 541, 551

[56] References Cited

U.S. PATENT DOCUMENTS

| | | | |
|---|---|---|---|
| 3,503,859 | 3/1970 | Goncarovs et al. | 493/326 |
| 4,097,645 | 6/1978 | Toyoda et al. | 428/474.4 |
| 4,402,262 | 9/1983 | Handforth | 427/261 |
| 4,483,464 | 11/1984 | Nomura . | |
| 4,617,199 | 10/1986 | Galli et al. | 427/208 |
| 4,710,358 | 12/1987 | Neuhaus | 493/326 |
| 4,751,141 | 6/1988 | Fink et al. | 428/326 |
| 4,813,578 | 3/1989 | Gordon et al. | 222/541 |
| 4,830,273 | 5/1989 | Kalberer et al. . | |
| 4,909,434 | 3/1990 | Jones et al. | 493/87 |
| 4,964,562 | 10/1990 | Gordon | 493/87 |
| 4,966,933 | 10/1990 | Kawakomi et al. | 427/41 |
| 5,008,137 | 4/1991 | Nugent, Jr. et al. | 428/35.4 |
| 5,021,042 | 6/1991 | Resnick et al. | 493/59 |
| 5,047,286 | 9/1991 | Kaburaki et al. | 427/412 |

OTHER PUBLICATIONS

Guide to Corona Film Treatment, Modern Plastics, J. C. von der Heide and H. C. Wilson, May 1961, pp. 199-202, 205, 206 and 344.

Primary Examiner—Stephen Marcus
Assistant Examiner—Christopher J. McDonald

[57] ABSTRACT

The polymer coated exterior of a paperboard container used to package liquid products is selectively treated with a flame or corona to raise the surface tension in the areas which are intended to accept ink while eliminating or canceling any surface treatment in the region where a pour spout fitment is to be bonded to the container.

10 Claims, 2 Drawing Sheets

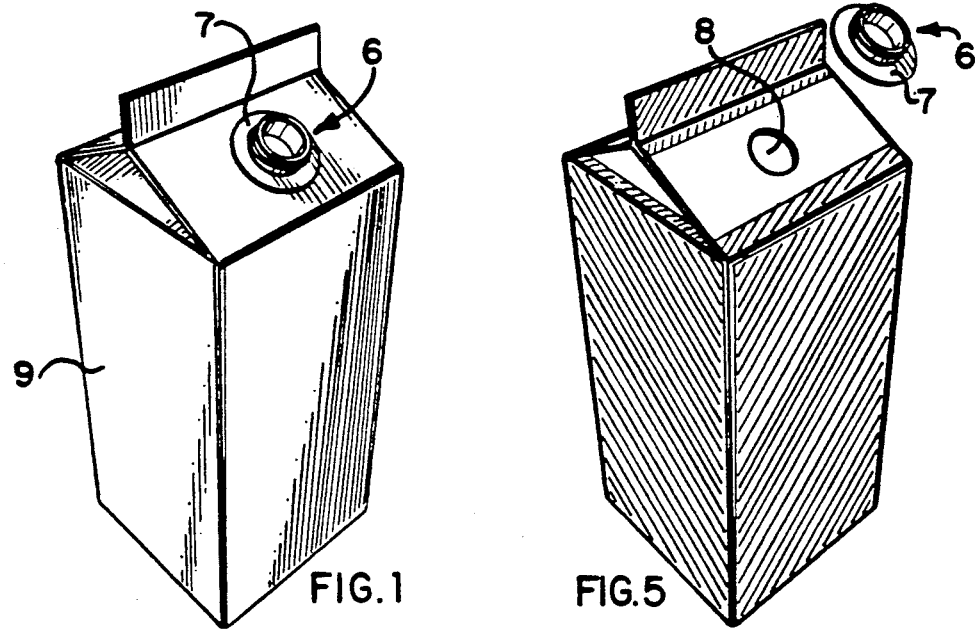
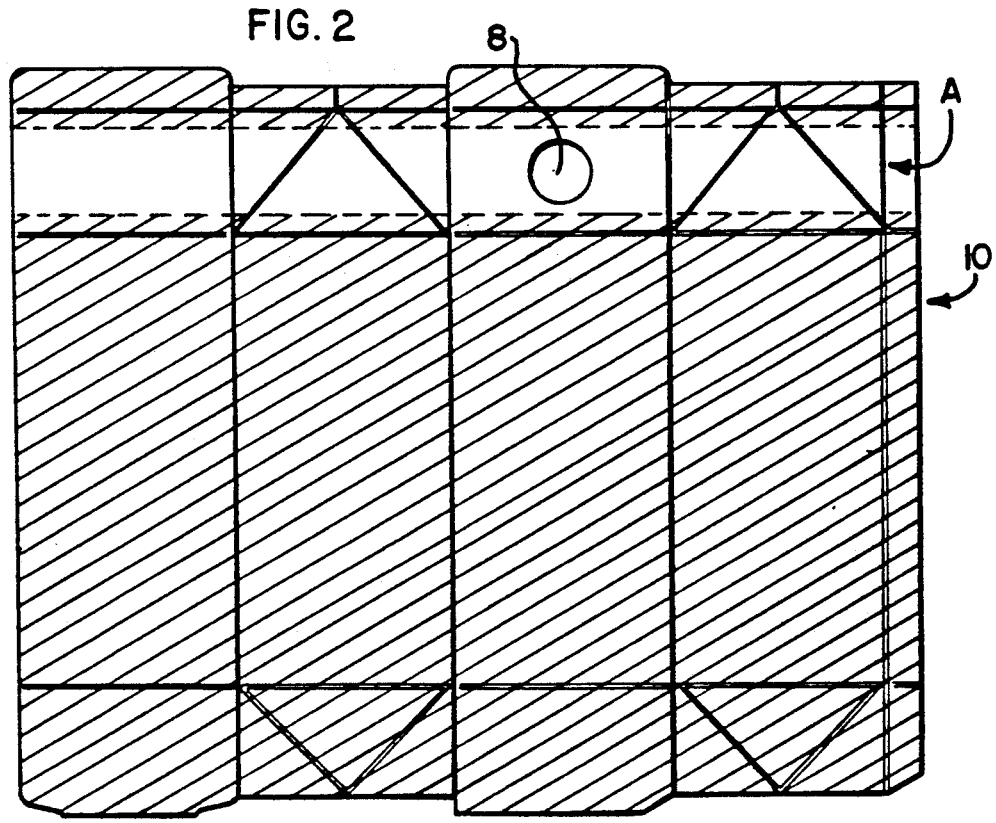

METHOD FOR BONDING POUR SPOUTS TO CONTAINERS

BACKGROUND OF INVENTION

The present invention relates to paperboard containers for liquid products and more particularly to a method for bonding pour spouts to such containers.

A preferred embodiment comprises a container prepared from a flat blank of paperboard, the outside surface of which is coated with a polymer material and printed with graphics suitable for the packaged product. The polymer material most often used for this purpose is a low surface energy polyolefin such as polyethylene, preferably low density polyethylene (LDPE), although other low surface energy polymers such as polypropylene, could be used. Typical of such containers are gable top or flat top parallelopiped constructions which include a pour opening at the top thereof over which a pour spout fitment may be attached. The pour spout fitment is generally made from a molded plastic material such as polypropylene and includes a flanged base portion which is adhered to the outer surface of the container in alignment with the pour opening. A screw cap is generally provided for the pour spout and additional seals may be provided either over the pour opening itself or over the end of the pour spout beneath the screw cap.

As stated above, in the preferred embodiment of the present invention, the pour spout fitment is located on the outer surface of the container over the pour opening in such a manner that the flange portion of the pour spout fitment may be adhered to the container surface in the region immediately adjacent to the pour opening. In the usual course of manufacture, coated paperboard blanks are printed, side seamed and shipped to the customer where the spouts are affixed to the containers as part of the form, fill and seal operation. Unfortunately, problems have occurred in getting good adhesion between the flange of the pour spout fitment and the paperboard container. These problems result in leaking containers and other unsatisfactory performance.

At least one prior art method has been attempted to achieve a good seal between the pour spout and the container. In U.S. Pat. No. 4,830,273, a reinforcing patch is applied to the exterior surface of the container blank over the pour opening prior to bonding the pour spout flange to the container. Meanwhile in U.S. Pat. No. 4,483,464, projecting rings are provided on the flange which are embedded in the container surface for improved adhesion. Nevertheless, the proper functioning of the container/pour spout combination can still be disrupted either when the container is opened or during use. Thus it is a general object of the present invention to prevent the problems that have occurred in the past and to provide an improved means for bonding pour spouts to containers.

SUMMARY OF INVENTION

As will appear from the detailed description and drawings of the present invention, the container of the present invention is preferably of the gable top construction which is prepared from a container blank in the conventional manner. It will be understood, however, that the container may take any desired shape or form as required by the user. The pour spout fitment is located on one of the upper surfaces of the container preferably in alignment with and over a suitable pour opening in the container material.

However, before applying the pour spout fitment to the container surface, the container blank is printed with suitable graphics consistent with the product to be packaged. Since the low surface energy materials used to coat the blanks do not readily accept ink, the outer surfaces of the blanks are treated, preferably by flame or corona treatment, either prior to or during the printing process for the purpose of increasing the surface tension of the polymer coated surface to achieve proper ink adhesion. Inexplicably, this treatment interferes with the efficient and proper bonding of the pour spout fitment flange to the container surface. Corona or flame treatment of polymer coated surfaces is a well known procedure that is practiced in the art to improve the printability of printing inks on low surface energy plastic materials as taught in the articles entitled "Corona Treatment", by David Markgraf, published for the 1986 Coextrusion Conference, Tappi Seminar Notes, pages 85-91, and "Guide to Corona Film Treatment", by J. C. VonderHeide and H. L. Wilson, *Modern Plastics* magazine, May 1961, pp. 199-202, 205, 206 and 344. However, prior to the present invention, it was found that a corona or flame treatment of the outer polyethylene coated surface of a paperboard blank to increase the surface tension from a typical value of 28-34 dynes/cm$^2$ for LDPE, for example, to a range of from about 38-42 dynes/cm$^2$, for proper adhesion of the inks, seriously hindered the successful adherence of a plastic pour spout fitment to the treated surface. Thus, to overcome this problem, the coated surface of the paperboard is selectively treated according to the present invention to eliminate any surface treatment of the blank in the region where the pour spout fitment is to be attached, while providing the desired surface treatment to the remainder of the blank surface for proper ink adhesion.

DESCRIPTION OF DRAWING

FIG. 1 is a perspective view of a container according to the present invention showing one form of the pour spout application;

FIG. 2 is a plan view of a paperboard blank including a pour opening that has been treated in accordance with the present invention;

FIG. 5 is an expanded perspective view showing a typical container that has been treated and its associated pour spout fitment.

DETAILED DESCRIPTION

The present invention relates to a method and means for securely bonding pour spout fitments to the exterior of polymer coated paperboard containers. The containers are preferably of the gable-top variety but may have flat-tops or take other shapes as desired. During the process of manufacture, polymer coated paperboard is cut, scored and printed to form blanks which are converted into containers or the like. Pour spout fitments are attached to the container blanks during the form, fill and seal steps.

However, prior to the cutting, scoring and printing steps, the outer surface of the paperboard is generally treated either by flame or corona application to increase the surface tension of the polymer for enhanced ink adhesion. This treatment is generally carried out on the printing press with the paperboard in web form prior to the scoring, printing and cutting steps. If the container is to be provided with a pour spout fitment, a pour opening is applied to the container blank during the cutting step. However, as pointed out hereinbefore, the flame or corona treatment necessary to achieve good ink adhesion inexplicably interferes with the bonding of the pour spout fitment to the container structure. Thus, in order to overcome this problem, the flame or corona treatment is masked or eliminated from the paperboard in the region where the pour spout fitment is applied.

Figure 3:
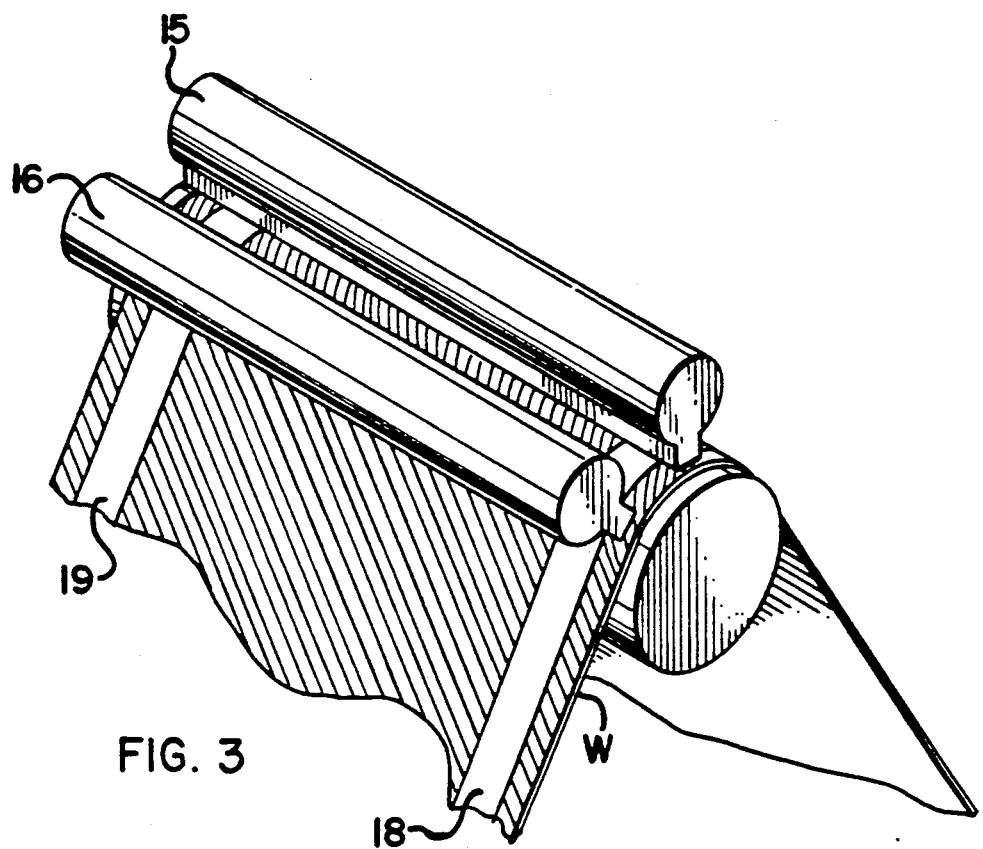
FIG. 3 is a schematic view of a typical corona treatment process as practiced according to the present invention.
Figure 4:
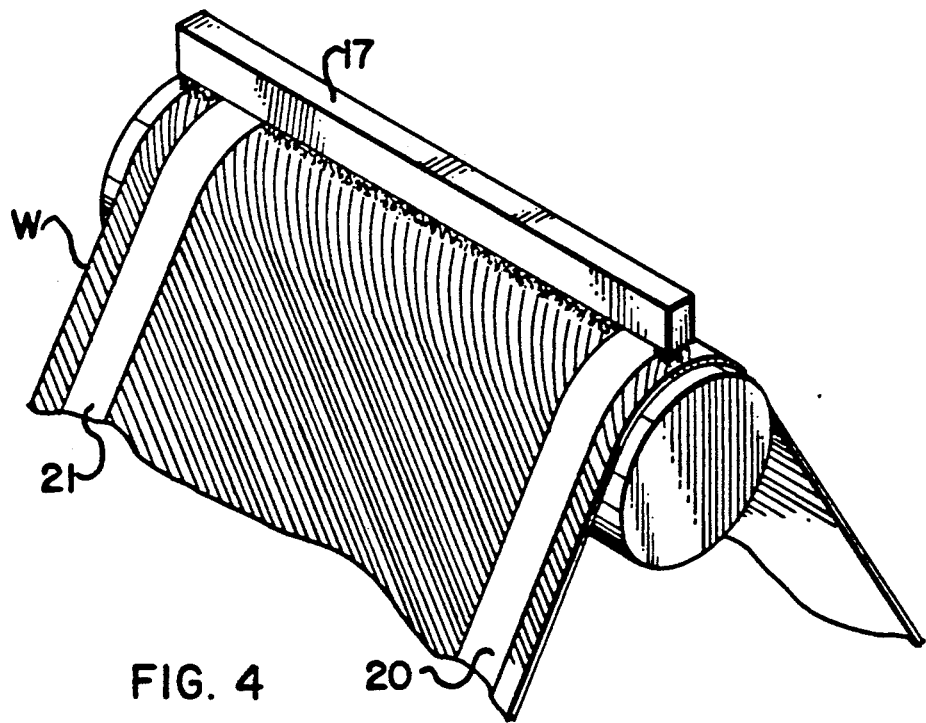
FIG. 4 is a schematic view of a typical flame treatment process as practiced according to the present invention.

In a typical flame or corona treatment process as shown schematically in FIGS. 3 and 4, the present invention is practiced by simply omitting or blanking out the treatment process in the area of the paperboard where the pour spout fitment is to be applied. However, since the treatment need only be eliminated in the area immediately adjacent to the pour opening, the same effect could be achieved by nullifying or removing the treatment during any subsequent printing step or during the form, fill and seal operation just prior to bonding the pour spout fitment to the container body. Note in FIGS. 3 and 4 that the web is passed beneath a series of corona treater heads 15, 16 or a gas flame treater 17. In the illustration shown, the web W would be wide enough to provide at least two rows of blanks with the pour openings for each row of blanks located at the side edges of the web. Thus, as shown, the corona or flame treatment is eliminated at the two side edges of the web W at locations 18, 19 and 20, 21 where ultimately the pour spout openings are formed in the blank.

FIG. 2 illustrates in plan a typical container blank 10 cut from the treated web W shown in FIGS. 3 or 4. The untreated area A extends completely across each of the upper panels which form the gable top of the container 9 of Figures and 1 and 5 including the panel which has the pour opening 8. If desired, of course, the entire web W could be corona or flame treated and then the corona treatment obliterated or canceled only in the region where the flange 7 of pour spout fitment 6 is attached to the container panel. This could be accomplished during the printing step or later in the form, fill and seal process just prior to adhering the pour spout fitment 6 to the container panel.

The pour spout fitment is preferably adhered to the outer surface of the container panel by impulse heating under pressure such as ultrasonic sealing although other methods may be used as desired. It has been found that the surface tension of the preferred polyethylene outer coating ranges from about 28-34 dynes/cm$^2$ as applied to the paperboard. A surface energy value in this range has been found to be suitable for satisfactorily sealing the flange 7 of the pour spout fitment 6 to the container panel. Meanwhile a typical corona or flame treatment process generally needs to increase the surface tension of the outer polyethylene surface to about 38-42 dynes/cm$^2$ in order to achieve proper ink adhesion. This change in surface tension is significant enough to interfere with the successful bonding of plastic pour spout fitments to the polymer coated surface.

As described above, the present invention provides a means and method for achieving both good ink adhesion on the outer surface of polymer coated containers and a strong bond between such containers and pour spout fitments adhered to the outer surface of one of the panels of the container.

What is claimed is:

1. In combination, a container body and an externally applied pour spout fitment, said container body having an outer surface coated with a low surface energy thermoplastic polymeric coating and including a pour opening of a desired size in a predetermined part thereof, said coated surface being treated for improved ink adhesion, and a pour spout fitment with an integral flange portion which is adhered to the outer surface of the said container body in alignment with said pour opening, the improvement wherein the region of the container body immediately adjacent to said pour opening is deliberately untreated to achieve an improved bond between the flange of said pour spout fitment and the container body.

2. The combination of claim 1 wherein the thermoplastic polymeric coating applied to the outer surface of said container body is selected from the group consisting of polyethylene and polypropylene.

3. The combination of claim 2 wherein the treatment applied to the outer surface of said container body for improved ink adhesion comprises a corona or flame treatment to increase the surface tension of said surface.

4. The combination of claim 3 wherein the flange of the pour spout fitment is adhered to the untreated region of said container body by ultrasonic heat and pressure.

5. A method for manufacturing paperboard blanks adapted to accommodate externally applied pour spout fitments and which may be formed into containers for containing and dispensing liquids comprising:
    (a) selecting a web of coated paperboard for use in forming the blanks, said paperboard being coated at least on its outer surface with a low surface energy thermoplastic polymeric coating;
    (b) treating the outer coated surface of said paperboard web to increase its surface tension for improved ink adhesion;
    (c) printing the individual blank structures with graphics suitable for the liquid product to be packaged in the cartons formed from the blanks;
    (d) scoring the web to define individual blank structures within the web area;
    (e) cutting the individual blank structures from the web area and simultaneously cutting a pour opening of a desired size in a predetermined part of each blank;
    (f) the improvement wherein the part of the web wherein the pour openings for the blank structures are located is screened during treating step (b) so as to leave the region immediately adjacent to the pour openings deliberately untreated for improving the bond between subsequently applied pour spout fitments and the outer coated blank structure.

6. The method of claim 5 wherein the treating step (b) comprises a corona or flame treatment to increase the surface tension of the coated surface.

7. The method of claim 6 wherein the surface treatment achieves a surface tension in the range of from about 38-42 dynes/cm$^2$.

8. The method of claim 7 wherein the improvement in step (f) is achieved by eliminating the treatment from the web in the desired areas.

9. A paperboard blank for a container for liquids adapted to accommodate an externally applied pour spout fitment comprising:
(a) a plurality of discreet container wall panels foldably attached together;
(b) a pour opening of a desired size located in a predetermined part of one of said container wall panels;
(c) a thermoplastic coating of a low surface energy polyolefin material applied at least to the outer surface of said paperboard blank;
(d) graphics suitable for the product to be packaged in said container printed on the outer coated surface of said paperboard blank; and,
(e) a treatment for the outer coated surface of said paperboard blank designed to improve the adhesion of inks printed on said blank, the improvement wherein the region of said blank immediately adjacent to the pour opening in each blank is deliberately untreated for improving the bond between the subsequently applied pour spout fitments and the outer coated surface of the blank.

10. A paperboard blank as recited in claim 9 wherein the outer coating is polyethylene, the printed surface of which is treated to have a surface tension in the range of from about 38–42 dynes/cm$^2$ and the untreated region immediately adjacent to said pour opening has a surface tension on the order of about 28–34 dynes/cm$^2$.

* * * * *